(12) United States Patent
Schweitzer et al.

(10) Patent No.: US 10,106,178 B2
(45) Date of Patent: Oct. 23, 2018

(54) BEARING ASSEMBLY FOR A TRACTION MOTOR OF A RAILWAY VEHICLE

(71) Applicants: Ferdinand Schweitzer, Sankt Peter in der Au (AT); Morgan J Bullard, Carpentersville, IL (US)

(72) Inventors: Ferdinand Schweitzer, Sankt Peter in der Au (AT); Morgan J Bullard, Carpentersville, IL (US)

(73) Assignee: AKTIEBOLAGET SKF, Gothenburg (SE)

(*) Notice: Subject to any disclaimer, the term of this patent is extended or adjusted under 35 U.S.C. 154(b) by 95 days.

(21) Appl. No.: 15/234,774

(22) Filed: Aug. 11, 2016

(65) Prior Publication Data

US 2017/0043795 A1     Feb. 16, 2017

Related U.S. Application Data

(60) Provisional application No. 62/205,252, filed on Aug. 14, 2015.

(51) Int. Cl.
| | |
|---|---|
| *B61F 15/20* | (2006.01) |
| *B61C 9/46* | (2006.01) |
| *F16C 33/78* | (2006.01) |
| *F16C 33/80* | (2006.01) |
| *F16C 19/06* | (2006.01) |
| *F16C 19/26* | (2006.01) |

(52) U.S. Cl.
CPC ............... *B61F 15/20* (2013.01); *B61C 9/46* (2013.01); *F16C 19/06* (2013.01); *F16C 19/26* (2013.01); *F16C 33/7876* (2013.01); *F16C 33/805* (2013.01); *F16C 2326/10* (2013.01)

(58) Field of Classification Search
CPC ............ B61C 9/46; B61F 15/20; F16C 19/06
See application file for complete search history.

(56) References Cited

U.S. PATENT DOCUMENTS

| | | | | |
|---|---|---|---|---|
| 3,628,837 | A * | 12/1971 | Otto | F16C 33/80 384/462 |
| 4,354,850 | A * | 10/1982 | Piepenbreier | B61C 9/46 464/32 |
| 5,289,120 | A * | 2/1994 | Moretti | B60T 8/171 310/168 |
| 6,343,554 | B1 * | 2/2002 | Affeldt | B60B 17/0013 105/136 |
| 6,561,559 | B1 * | 5/2003 | Skiller | B61F 15/20 295/36.1 |

(Continued)

*Primary Examiner* — Jason C Smith
(74) *Attorney, Agent, or Firm* — Mark Ussai; SKF USA Inc. Patent Dept.

(57) ABSTRACT

A bearing assembly for a traction motor of a railway vehicle includes at least one rolling-element bearing having an inner ring and an outer ring. At least one row of rolling elements is disposed between the inner ring and the outer ring. A sealing assembly is disposed in at least one of the axial end portions of the rolling-element bearing. The sealing assembly includes a first sealing region disposed adjacent to the bearing rings, and a second sealing region spaced farther from the bearing rings than the first seal region. The first sealing region includes a lip seal, and the second sealing region includes a labyrinth seal. The internal volume surrounding the rolling elements located between the bearing rings is in fluid communication with the atmosphere.

22 Claims, 2 Drawing Sheets

(56) References Cited

U.S. PATENT DOCUMENTS

| | | | |
|---|---|---|---|
| 8,790,014 B2* | 7/2014 | Shimizu | F16C 33/80 277/412 |
| 9,541,128 B2* | 1/2017 | Erskine | F16J 15/3296 |
| 2010/0260447 A1* | 10/2010 | Schweitzer | F16C 19/16 384/8 |
| 2015/0151575 A1* | 6/2015 | Le Moigne | B61F 15/20 301/110 |
| 2017/0043795 A1* | 2/2017 | Schweitzer | F16C 33/7876 |
| 2017/0045087 A1* | 2/2017 | Schweitzer | F16C 33/6659 |

* cited by examiner

BEARING ASSEMBLY FOR A TRACTION MOTOR OF A RAILWAY VEHICLE

CROSS-REFERENCE TO RELATED APPLICATION

The present application claims priority to U.S. provisional application No. 62/205,252, the contents of which are incorporated fully herein by reference.

TECHNICAL FIELD

The invention generally relates to a bearing assembly for a traction motor of a railway vehicle, such as a train or streetcar.

BACKGROUND ART

Bearing assemblies of the above-mentioned type are used in railway vehicle construction, such as in electric traction motors of railway vehicles, such as trains and streetcars. They are often configured as cylindrical roller bearings or as deep groove ball bearings. In such designs, the seal assembly is typically designed as a labyrinth seal so that friction remains low during operation of the bearing. In order to keep the rolling-element bearing in operational condition in an uninterrupted manner, the rolling elements must be supplied with lubricant, which can be provided as a lubricating grease or a lubricating oil.

According to a commonly-used design, the lubricating oil is led (supplied) directly from an adjacent transmission into the bearing assembly. That is, the lubricating oil is collected from the transmission and is supplied to the bearing assembly. Excess oil drains from the bearing assembly and is guided back into the transmission. In such a design, lattices having mesh widths in the range of 2-3 millimeters are disposed in the oil flow path in order to filter out at least large contaminants and to prevent such particles from getting into the rolling-element bearing. Then, the oil can be taken (suctioned out) from a location (oil pan) in the transmission where the oil settles.

Even at high rotational speeds and with high demands on operational performance, the same lubricating oil is still often utilized for both the transmission and the traction motor. Therefore, the oil circulating circuit and the lubricating oil often become contaminated due to passage through both the transmission and the traction motor. Furthermore, the traction motor then becomes very susceptible to loss of transmission oil. In case too much transmission oil is lost, bearing damage can result due to insufficient lubrication, which is a significant shortcoming of known traction motor designs.

SUMMARY

In one aspect of the present teachings, a bearing assembly for a traction motor of a railway vehicle is disclosed that is designed to decouple the lubrication of the bearing unit from the transmission-oil lubrication. It is preferable that the rolling-element bearing unit can be lubricated at least substantially independently of the transmission. Abrasive contaminants from the transmission as well as from the traction motor can then be excluded from the rolling-element bearing as much as possible or at least be greatly reduced. Thus an optimal sealing of the rolling-element bearing is possible for high-power traction motors.

In another aspect of the present teachings, a seal assembly for the rolling-element bearing is comprised of a first seal region that is disposed adjacent to the bearing rings, and is also comprised of a second seal region that is spaced farther from the bearing rings than the first seal region. The first seal region comprises a lip seal, the second seal region comprises a labyrinth seal, and the region (internal volume) containing the rolling elements located between the bearing rings is connected with the environment (atmosphere) via a fluid connection.

Such a seal assembly is preferably disposed only in one of the two axial end regions of the rolling-element bearing. In such an embodiment, only a lip seal may be disposed in the other of the two axial end regions of the bearing. In addition or in the alternative, the lip seal is preferably formed by at least one radial shaft seal. In addition or in the alternative, the fluid connection preferably comprises a bore located in a machine part that is disposed adjacent to the bearing rings. In addition or in the alternative, the fluid connection may optionally include a valve that opens at a prescribed differential pressure (pressure difference) between the region (internal volume) of the rolling elements and the environment.

The labyrinth seal preferably includes two cooperating (interacting) machine parts, of which the one is connected to the inner ring (directly or indirectly) so as to rotate therewith and the other is connected to the outer ring (directly or indirectly) so as to rotate therewith. The one machine part has a number (plurality) of segments (projections) projecting in the axial direction that are interleaved (mesh) in corresponding recesses that are incorporated into (defined or formed in) the other machine part.

In another embodiment of the present teachings, the labyrinth seal can include a machine part that has a number (plurality) of segments (projections) projecting in the radial direction that form seal gaps with respect to a shaft carrying the inner ring.

A metal cover plate can be disposed on a component connected to the inner ring so as to rotate therewith. In such an embodiment, the metal cover plate covers the labyrinth seal and protects it from the environment.

The seal lips can be held by a carrier ring that is connected to a machine part that is connected to the outer ring so as to rotate therewith. In this case, the carrier ring is preferably connected to the machine part by a screw connection or using a press-fit.

The present bearing assemblies may be advantageously used in traction motors of railway vehicles (TMBU—Traction Motor Bearing Unit). The rolling-element bearing can be reliably lubricated so that the service life of the bearing and thus of the traction motor can be extended. Planned maintenance intervals can optionally be increased due to the improved lubrication and reduced contamination. In particular, the present bearing assemblies can be advantageously used in high-power traction motors having a power rating (horsepower), e.g., equal to or greater than 150 kW.

The rolling-element bearing optionally may be designed as a cylindrical roller bearing or as a deep groove ball bearing.

Due to the at least one contacting seal provided in bearing assemblies according to the present teachings, the lubricating oil for the rolling-element bearing can be reliably retained in the bearing space. Furthermore, ingress of abrasive dirt-particles into the rolling-element bearing region can be reliably reduced.

In another embodiment of the present teachings, ventilation of the rolling-element bearing space is provided in order to equalize pressure differences and thus ensure a reliable operation of the at least one rubbing (lip) seal.

Bearing assemblies according to the present teachings can be lubricated with bearing oil, bearing grease, or a mixture thereof in an advantageous manner in a manner that ensures reliable operation of the bearing assembly.

The service interval for the maintenance of the rolling-element bearing can also advantageously be significantly increased since the rolling-element bearing can be reliably supplied with clean lubricant. Consequently, less wear on the bearing rings and on the rolling elements results.

The ingress of dirt and foreign particles is significantly reduced so that improved lubrication conditions can be maintained in the rolling-element bearing.

The lubricant can be reliably supplied to the bearing even if the oil supply in the adjacent transmission is deficient for any reasons. In this respect the bearing assembly is provided or designed as a closed system.

The specifications concerning the service life of traction motors of railway vehicles can thus be improved and more easily fulfilled. Current standards for maintenance intervals require maintenance to be performed, e.g., after an operational performance in the range of 600,000 to 1,000,000 km or an operating time of 5 years, which intervals can be increased. Corresponding costs for the maintenance of the bearing assembly can accordingly be saved with use of the proposed designs. This also applies to costs saved by not having to perform overhauls of the bearing assembly due to premature wear.

Further aspects, objects, embodiments and advantages of the present teachings will become apparent after reading the following description and claims in view of the drawings.

DETAILED DESCRIPTION OF PREFERRED EMBODIMENTS

Figure 1:
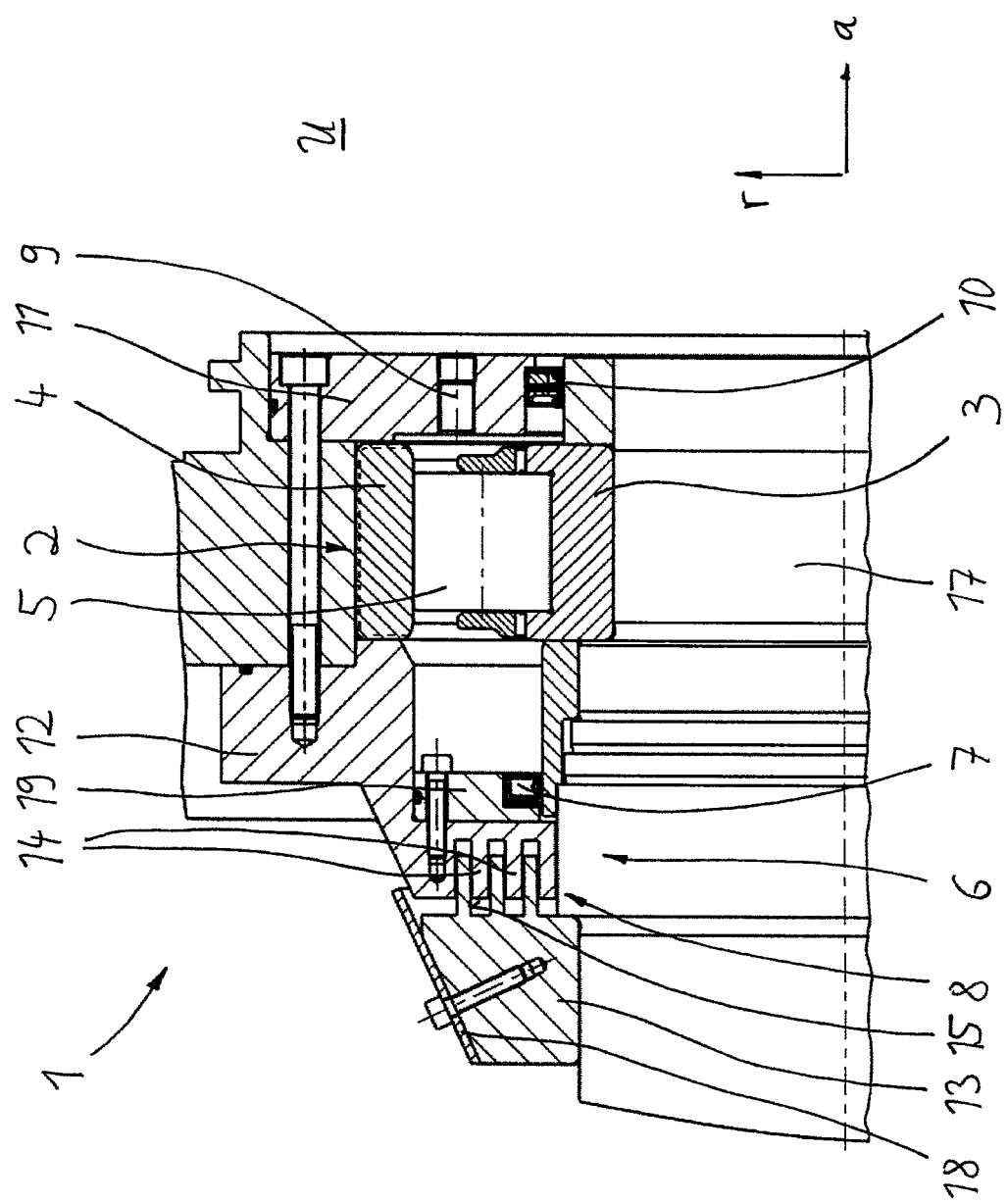
FIG. 1 shows, in radial cross-section, a representative, non-limiting bearing assembly of a railway vehicle traction motor according to a first embodiment of the present teachings.
Figure 2:
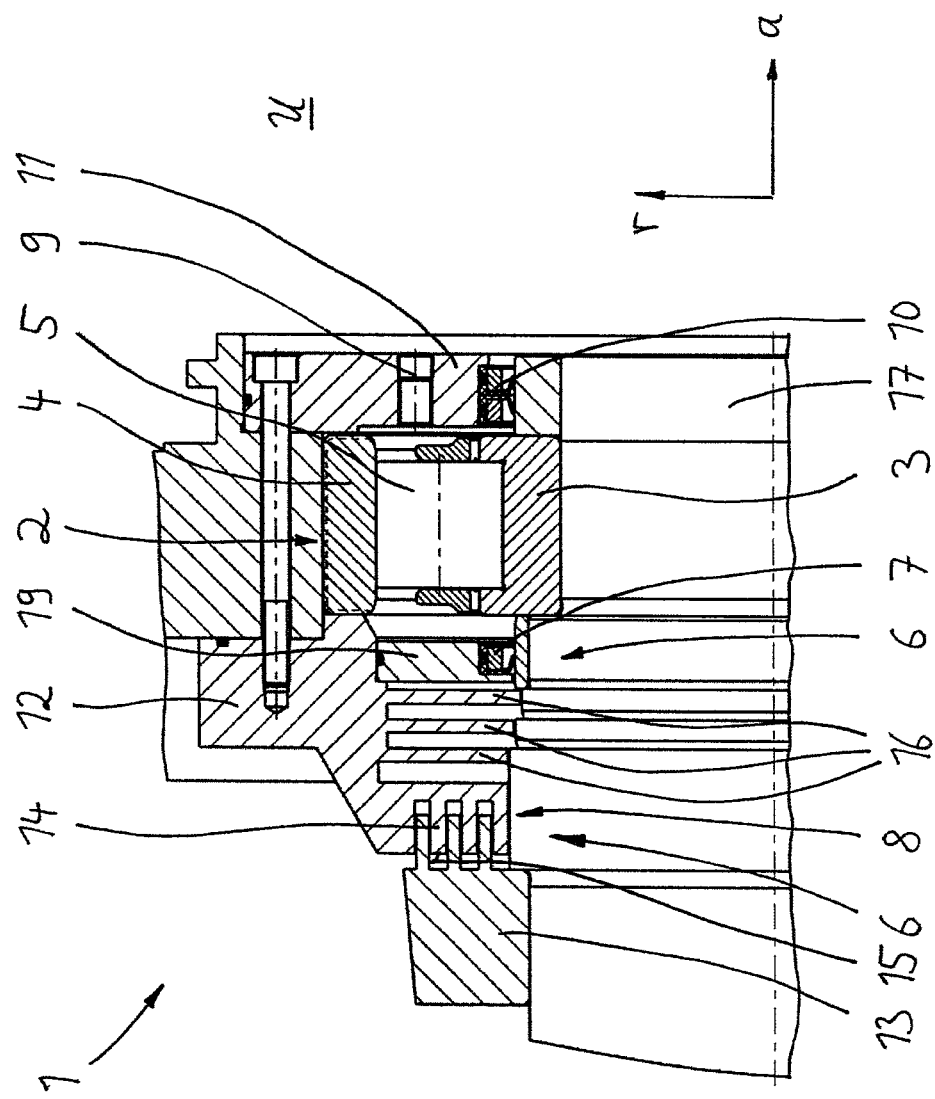
FIG. 2 shows, in radial cross-section, a modification of the embodiment shown in FIG. 1.

In FIGS. 1 and 2, bearing assemblies 1 for a railway vehicle traction motor are respectively shown. Such bearing assemblies 1 are designed to rotatably support a rotating shaft 17, for example of a train or a tram (streetcar).

The bearing assemblies 1 according to FIGS. 1 and 2 both comprise a rolling-element bearing 2 having an inner ring 3 and an outer ring 4, between which rolling elements 5 are disposed. Furthermore, seal assemblies are respectively provided in both axial end regions of the rolling-element bearing 2.

The seal assembly on the right side of the rolling-element bearing 2 is embodied as a lip seal in the form of a radial shaft seal, whereas a more complexly designed seal assembly 6 is provided on the left side of the rolling-element bearing 2.

More specifically, the seal assembly 6 on the left-side of FIGS. 1 and 2 comprises a first seal region 7 that is configured as a lip seal. This is a radial shaft seal, in which a seal lip slips on (is in sliding contact with) a sleeve-shaped slip ring that is mounted on the shaft 17. In addition to this first seal region 7, a second seal region 8 is provided and is configured as a labyrinth seal.

In the seal assembly 6, the first seal region 7 is disposed adjacent (e.g., directly adjacent) to the bearing rings 3, 4 and the second seal region 8 is spaced (e.g., in the axial direction) farther from the bearing rings 3, 4 than the first seal region 7. As was briefly explained above, the first seal region 7 comprises a lip seal, while the second seal region 8 comprises a labyrinth seal. To achieve reliable operation of the bearing assembly, the region of (the internal volume surrounding) the rolling elements 5 located between the bearing rings 3, 4 is connected with the environment (atmosphere) U via a fluid connection 9.

In the exemplary embodiments disclosed herein, the fluid connection 9 is or comprises a bore that is incorporated into (extends through) a machine part 11, which connects to the rolling-element bearing 2 and forms part of a housing structure that holds the rolling-element bearing 2.

The lip seal 7—configured as a radial shaft seal—is held by a carrier ring 19 that is mounted in a first machine part 12 that is also a component of the housing structure that holds the rolling-element bearing 2. This first machine part 12 is connected to the outer ring 4 of the rolling-element bearing 2 so as to rotate therewith. A second machine part 13 is connected to the shaft 17 so as to rotate therewith. According to the exemplary embodiments shown in FIGS. 1 and 2, the two machine parts 12 and 13 form two cooperating parts of the labyrinth seal. In the embodiment of FIG. 1, the first machine part 12 includes projecting segments (projections) 14 oriented in the axial direction (a) that are interleaved in corresponding recesses 15 defined in the second machine part 13 and thereby form a number (plurality) of (labyrinth-) seal gaps.

This concept is further extended in the exemplary embodiment shown in FIG. 2 wherein the first machine part 12 further includes a number (plurality) of segments (projections) 16 projecting in the radial direction (r). The segments (projections) 16 end near the shaft 17, thus forming gaps, and thus generating a (labyrinth-) seal effect.

In the embodiment shown in FIG. 1, a metal cover plate 18 is mounted on (screwed-onto) the second machine part 13. This metal cover plate 18 additionally covers the labyrinth gap or the access thereto.

REFERENCE NUMBER LIST

1 Railway vehicle traction motor bearing assembly
2 Rolling-element bearing
3 Inner ring
4 Outer ring
5 Rolling element
6 Seal assembly
7 First seal region (lip seal)
8 Second seal region (Labyrinth seal)
9 Fluid connection
10 Lip seal
11 Machine part with fluid connection
12 First machine part of the labyrinth seal
13 Second machine part of the labyrinth seal
14 Axially projecting segments
15 Corresponding recesses
16 Radially projecting segments
17 Shaft
18 Metal cover plate
19 Carrier ring
U Environment
a Axial direction
r Radial direction

We claim:

1. A bearing assembly for a traction motor of a railway vehicle, comprising:
    at least one rolling-element bearing that includes an inner ring and an outer ring,
    at least one row of rolling elements disposed between the inner ring and the outer ring, and
    a seal assembly disposed at least in one axial end region of the rolling-element bearing,
    wherein the seal assembly comprises:
    a first seal region disposed adjacent to the bearing rings and comprising a lip seal, and
    a second seal region spaced farther from the bearing rings than the first seal region, the second seal region comprising a labyrinth seal, and
    wherein an internal volume surrounding the rolling elements and located between the bearing rings is in fluid communication with the atmosphere via a fluid connection, the fluid connection comprising a bore extending through a machine part that is adjacent to the bearing rings.

2. The bearing assembly according to claim 1, wherein:
    the seal assembly is disposed only in one of two axial end regions of the rolling-element bearing, and
    only a lip seal is disposed in the other of the two axial end regions of the rolling-element bearing.

3. The bearing assembly according to claim 1, wherein the lip seal is formed by at least one radial shaft seal.

4. The bearing assembly according to claim 1, wherein the fluid connection includes a valve configured to open at a predetermined pressure difference between the internal volume surrounding the rolling elements and the atmosphere.

5. The bearing assembly according to claim 1, wherein:
    the labyrinth seal includes first and second machine parts,
    the first machine part is connected to the inner ring so as to rotate therewith,
    the second machine part is connected to the outer ring so as to rotate therewith,
    the first machine part includes a plurality of first projections extending in an axial direction of the at least one rolling element bearing, and
    the first projections are respectively interleaved in corresponding recesses defined in the second machine part.

6. The bearing assembly according to claim 5, wherein the second machine part includes a plurality of second projections extending in a radial direction of the at least one rolling-element bearing and configured to form a seal gap with respect to a shaft carrying the inner ring.

7. The bearing assembly according to claim 1, further comprising a metal cover plate that covers the labyrinth seal and is disposed on a component that is connected to the inner ring so as to rotate therewith.

8. The bearing assembly according to claim 1, wherein the lip seal is held by a carrier ring that is connected to a component that is connected to the outer ring so as to rotate therewith.

9. The bearing assembly according to claim 8, wherein the carrier ring is connected to the component by a screw connection or a press-fit.

10. The bearing assembly according to claim 2, wherein:
    the labyrinth seal includes first and second machine parts,
    the first machine part is connected to the inner ring so as to rotate therewith,
    the second machine part is connected to the outer ring so as to rotate therewith,
    the first machine part includes a plurality of first projections extending in an axial direction of the at least one rolling element bearing, and
    the first projections are respectively interleaved in corresponding recesses defined in the second machine part.

11. The bearing assembly according to claim 10, wherein the second machine part includes a plurality of second projections extending in a radial direction of the at least one rolling-element bearing and configured to form a seal gap with respect to a shaft carrying the inner ring.

12. The bearing assembly according to claim 11, wherein:
    the lip seal is held by a carrier ring, and
    the carrier ring is connected to the second machine by a screw connection or a press-fit.

13. The bearing assembly according to claim 12, wherein the lip seal is formed by at least one radial shaft seal.

14. The bearing assembly according to claim 13, wherein the fluid connection comprises a bore extending through a third machine part that is adjacent to the bearing rings.

15. The bearing assembly according to claim 14, further comprising a metal cover plate disposed on the first machine part and covering the labyrinth seal.

16. The bearing assembly according to claim 10, further comprising a metal cover plate disposed on the first machine part and covering the labyrinth seal.

17. The bearing assembly according to claim 16, wherein:
    the lip seal is held by a carrier ring, and
    the carrier ring is connected to the second machine by a screw connection or a press-fit.

18. The bearing assembly according to claim 17, wherein the lip seal is formed by at least one radial shaft seal.

19. A bearing assembly for a traction motor of a railway vehicle, comprising:
    at least one rolling-element bearing that includes an inner ring and an outer ring,
    at least one row of rolling elements disposed between the inner ring and the outer ring, and
    a seal assembly disposed at least in one axial end region of the rolling-element bearing,
    wherein the seal assembly comprises:
    a first seal region disposed adjacent to the bearing rings and comprising a lip seal, and
    a second seal region spaced farther from the bearing rings than the first seal region, the second seal region comprising a labyrinth seal,
    wherein an internal volume surrounding the rolling elements and located between the bearing rings is in fluid communication with the atmosphere via a fluid connection, and
    wherein the fluid connection includes a valve configured to open at a predetermined pressure difference between the internal volume surrounding the rolling elements and the atmosphere.

20. A bearing assembly for a traction motor of a railway vehicle, comprising:
    at least one rolling-element bearing that includes an inner ring and an outer ring,
    at least one row of rolling elements disposed between the inner ring and the outer ring, and
    a seal assembly disposed at least in one axial end region of the rolling-element bearing,
    wherein the seal assembly comprises:
    a first seal region disposed adjacent to the bearing rings and comprising a lip seal, and
    a second seal region spaced farther from the bearing rings than the first seal region, the second seal region comprising a labyrinth seal, wherein an internal volume surrounding the rolling elements and located between the bearing rings is in fluid communication with the atmosphere via a fluid connection, and wherein the labyrinth seal includes first and second machine parts, the first machine part is connected to the inner ring so as to rotate therewith, the second machine part is connected to the outer ring so as to rotate therewith, the first machine part includes a plurality of first projections extending in an axial direction of the at least one rolling element bearing, and the first projections are respectively interleaved in corresponding recesses defined in the second machine part.

21. A bearing assembly for a traction motor of a railway vehicle, comprising:

at least one rolling-element bearing that includes an inner ring and an outer ring, at least one row of rolling elements disposed between the inner ring and the outer ring, and a seal assembly disposed at least in one axial end region of the rolling-element bearing, wherein the seal assembly comprises:

a first seal region disposed adjacent to the bearing rings and comprising a lip seal, and a second seal region spaced farther from the bearing rings than the first seal region, the second seal region comprising a labyrinth seal, and wherein an internal volume surrounding the rolling elements and located between the bearing rings is in fluid communication with the atmosphere via a fluid connection, and wherein the bearing assembly further comprises a metal cover plate that covers the labyrinth seal and is disposed on a component that is connected to the inner ring so as to rotate therewith.

22. A bearing assembly for a traction motor of a railway vehicle, comprising:

at least one rolling-element bearing that includes an inner ring and an outer ring, at least one row of rolling elements disposed between the inner ring and the outer ring, and a seal assembly disposed at least in one axial end region of the rolling-element bearing, wherein the seal assembly comprises:

a first seal region disposed adjacent to the bearing rings and comprising a lip seal, and a second seal region spaced farther from the bearing rings than the first seal region, the second seal region comprising a labyrinth seal, and wherein an internal volume surrounding the rolling elements and located between the bearing rings is in fluid communication with the atmosphere via a fluid connection, and wherein the lip seal is held by a carrier ring that is connected to a component that is connected to the outer ring so as to rotate therewith.

* * * * *